United States Patent
Cain, III et al.

(10) Patent No.: US 8,131,894 B2
(45) Date of Patent: Mar. 6, 2012

(54) METHOD AND SYSTEM FOR A SHARING BUFFER

(75) Inventors: Harold Wade Cain, III, Hartsdale, NY (US); Rui Hou, Beijing (CN); Xiaowei Shen, Beijing (CN); Huayong Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 109 days.

(21) Appl. No.: 12/623,496

(22) Filed: Nov. 23, 2009

(65) Prior Publication Data

US 2010/0138571 A1 Jun. 3, 2010

(30) Foreign Application Priority Data

Nov. 27, 2008 (CN) .......................... 2008 1 0181608

(51) Int. Cl.
*G06F 13/12* (2006.01)

(52) U.S. Cl. .......................................... 710/52; 710/56

(58) Field of Classification Search .................. 710/52, 710/56
See application file for complete search history.

(56) References Cited

U.S. PATENT DOCUMENTS

| 5,333,303 | A | 7/1994 | Mohan |
| 6,768,992 | B1 | 7/2004 | Jolitz |
| 7,158,964 | B2 | 1/2007 | Wolrich et al. |
| 2006/0085588 | A1* | 4/2006 | Rajwar et al. .................. 711/100 |
| 2008/0005504 | A1* | 1/2008 | Barnes et al. .................. 711/156 |

OTHER PUBLICATIONS

K. Schmidt, "Green Computing—A Case for Data Caching and Flash Disks?", ICEIS 2008, vol. DISI, Barcelona, Spain, Jun. 12-16, 2008.
M. P. Herlihy et al, Transactional Memory: architectural support for lock-free data structures. In Proc. 1993 Int Symp on Computer Architecture (ISCA), May 1993, San Diego, CA.

* cited by examiner

*Primary Examiner* — Chun-Kuan Lee
*Assistant Examiner* — David Martinez
(74) *Attorney, Agent, or Firm* — Vazken Alexanian

(57) ABSTRACT

A system, method, and computer readable article of manufacture for sharing buffer management. The system includes: a predictor module to predict at runtime a transaction data size of a transaction according to history information of the transaction; and a resource management module to allocate sharing buffer resources for the transaction according to the predicted transaction data size in response to beginning of the transaction, to record an actual sharing buffer size occupied by the transaction in response to the successful commitment of the transaction, and to update the history information of the transaction.

18 Claims, 5 Drawing Sheets

METHOD AND SYSTEM FOR A SHARING BUFFER

CROSS-REFERENCE TO RELATED APPLICATION

This application claims priority under 35 U.S.C. §119 from Chinese Patent Application No. 200810181608.3 filed on Nov. 27, 2008, the entire contents of which are incorporated herein by reference.

BACKGROUND OF THE INVENTION

1. Field of the Invention

The present invention generally relates to the field of information technology and, more particularly, to a sharing buffer management method and system.

2. Description of Related Art

Researchers have proposed hardware-based transactional memory systems to ameliorate problems existing in traditional lock-based parallel programming models. Transactional memory systems allow programmers to specify regions of code called transactions that execute in a serialized fashion. That is to say, each transaction only executes its corresponding code in a thread. Transactional memory systems allow applications to access shared data in a parallel and atomic fashion.

Transactional memory can improve the performance of parallel programs. The article "Transactional Memory: Architectural Support for Lock-Free Data Structures," by M. P. Herlihy and J. E. B. Moss, in Proceedings of the 1993 International Symposium on Computer Architecture (ISCA), May 1993, San Diego, Calif., contains information on the implementation of transactional memory and some related terms or concepts. Hardware dedicated buffers and related control mechanisms are widely adopted in hardware or hybrid transactional memory systems to implement version management and conflict detection.

The design of hardware dedicated buffers is closely related with the features of multi-core architecture. There are two important features or trends observed from the development of multi-core architecture. The simultaneous multi-threading (SMT) processor core is becoming more and more popular. Also, more cores are integrated in the same chip. High implementation costs will result if each hardware thread, in case of a SMT core, or each core, in the case of a multi-core system, needs a private dedicated buffer. Therefore, it is necessary to share the buffer among multiple hardware threads for a SMT core or processor cores for a multi-core system.

Traditional management methods for a hardware sharing buffer can be generally categorized by two different approaches.

(1) Exclusive Sharing Buffer

All the transactions from different threads contend for the same sharing buffer, and only one transaction can be allowed to access this sharing buffer, i.e., exclusive access, until the whole transaction finishes as a result of successful commit or retry. Therefore, an exclusive sharing buffer can be implemented with simple hardware logic. However, such a design possibly leads to performance loss, since it greatly limits potential concurrency.

(2) Non-Exclusive Sharing Buffer

In this design, data from different transactions is marked with different colors. The transactions are distributed in the sharing buffer. Such distribution is usually carried out at the fine granularity of cache line unit. In order to tell the transaction which data is stored in each cache line, each cache line in a buffer has a corresponding color mark. The major advantage of a non-exclusive sharing buffer is that it can get better resource utilization when compared with exclusive sharing methods.

However, the design for a non-exclusive sharing buffer will significantly increase the implementation complexity of transaction commit, abort, replacement, as well as conflict detection. In this case transactions are randomly distributed in the non-exclusive sharing buffer at traditional fine granularity, i.e., at the granularity of the cache line.

For transaction commit and transaction abort, hardware logic has to compare each cache line to match the target color; for replacement policy in case of conflict miss, it is hard for hardware to choose one transaction to be replaced, for example, a small transaction might abort a large one, or a new transaction might abort one which is to be committed; and for conflict detection, hardware has to attach a color register and corresponding comparison logic for each cache line. This significantly increases the hardware cost.

SUMMARY OF THE INVENTION

To overcome the defects in the prior art, the present invention proposes a new dynamic sharing buffer scheme in hardware transactional memory systems. This sharing buffer management scheme can dynamically allocate a buffer for multiple transactions based on the prediction of transaction demand buffer sizes. Further, hardware is simplified by changing the allocation granularity of the sharing buffer according to an embodiment of the present invention.

Therefore, in a first aspect of the present invention, there is provided a sharing buffer management system. The system includes: a predictor module to predict at runtime a transaction data size of a transaction according to history information of the transaction; and a resource management module to allocate sharing buffer resources for the transaction according to the predicted transaction data size in response to beginning of the transaction, to record an actual sharing buffer size occupied by the transaction in response to the successful commitment of the transaction, and to update the history information of the transaction.

According to another aspect of the present invention, there is provided a method implemented by a computing apparatus for managing a sharing buffer. The method includes the steps of: predicting at runtime by a predictor module a transaction data size of a transaction according to history information of the transaction; allocating sharing buffer resources for the transaction by a resource management module according to the predicted transaction data size in response to beginning of the transaction; recording by the resource management module an actual sharing buffer size occupied by the transaction, in response to the successful commitment of the transaction; and updating the history information of the transaction by the resource management module, thereby managing the sharing buffer by the computing apparatus.

In still another aspect of the present invention, there is provided a computer readable article of manufacture tangibly embodying computer readable instructions for executing the computer implemented method.

The solutions presented by the present invention can shift complexity from the hardware to the software almost without performance loss. Through predicting the buffer demand size of a transaction, the new sharing buffer management solution can dynamically allocate resources for multiple transactions.

Preferably, buffer resources are dynamically allocated for multiple transactions at the granularity of the cache way. In this regard, the solution according to the present invention can greatly simplify hardware implementation, since only one color bit register per cache way is needed and commit and abort logic configuration will also be simplified.

BRIEF DESCRIPTION OF THE DRAWINGS

Like reference numerals designate the same, similar, or corresponding features or functions throughout the drawings.

DETAILED DESCRIPTION OF THE PREFERRED EMBODIMENTS

The present application applies to the field of transactional memory technology. Description will be given below in the context of an example of the running environment for transactional memory. That is to say, applications running on a processor contain several transactions, and these transactions use a sharing buffer to store intermediate state data. Identifications (ID) indicating these transactions are marked with colors. It is understood by those skilled in the art that the present invention is not limited to this. Transactions can be abstracted to more generic conceptual programs since transactions are part of an application.

One of major challenges for the sharing buffer design solution in hardware transaction memory systems is on-demand resource management, which is very critical for system performance. For instance, several transactions with different data sizes contend for the same sharing buffer. Then, the on-demand resource management policy will determine the response to possible transaction combinations, so that the total demand size of these transactions does not reach the limit of the total hardware resource.

Another advantage of on-demand resource management is that, if one transaction with a large data size always causes the buffer to overflow, such a transaction will directly fall into the special handling process for overflow at runtime and thus avoid occupying the hardware buffer. According to an embodiment of the present invention, on-demand resource management requires the resource allocation logic to have the total buffer size requested by a transaction at the beginning of the transaction. This is provided by a mechanism for predicting the transaction data size.

It has been observed experimentally that most transactions have a predictable write data size, representative of a possible demand buffer size of this transaction during execution. This indicates the possibility of predicting the transaction data size, i.e., the demand buffer size of the transaction.

Figure 1:
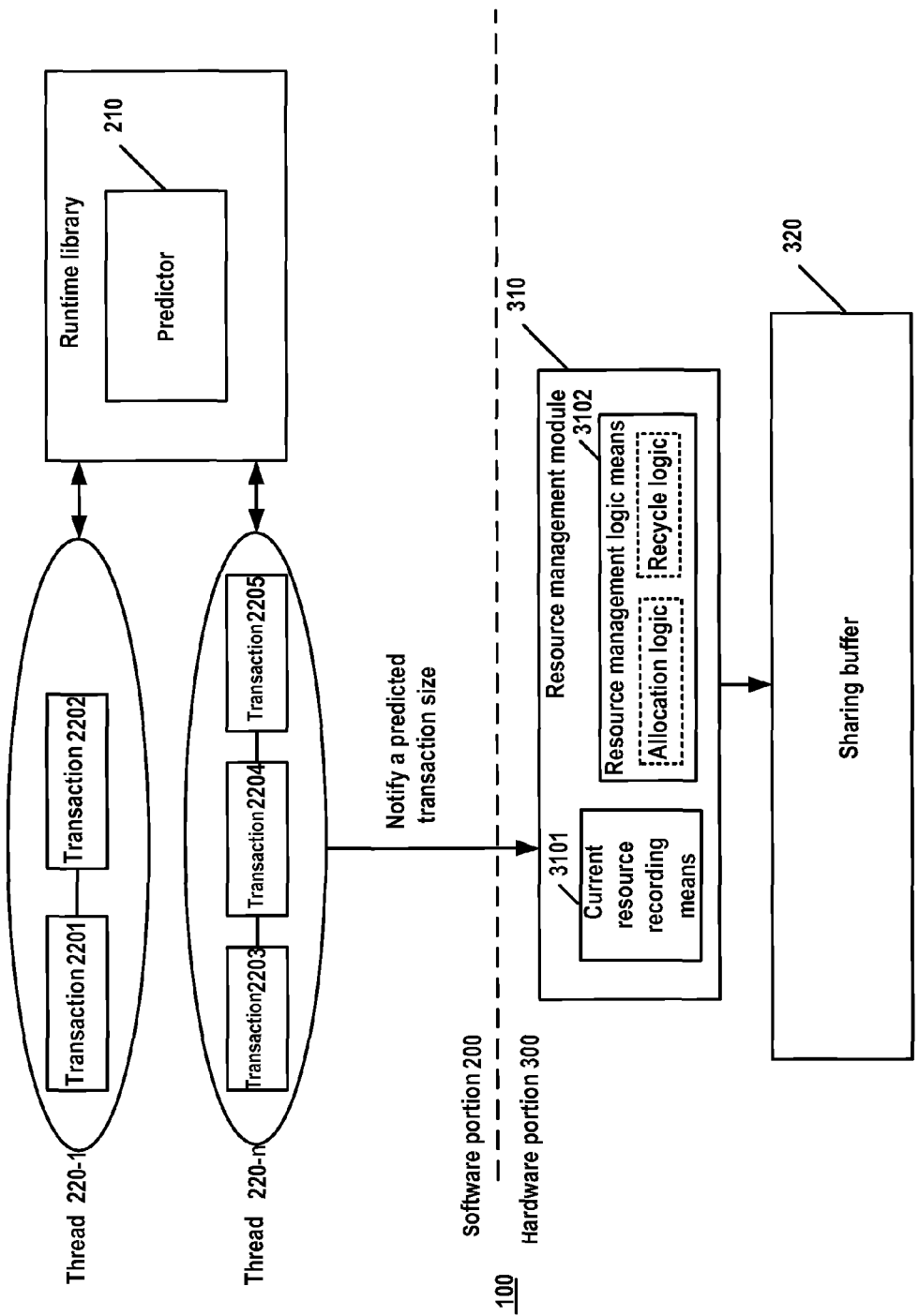
FIG. 1 schematically shows the architecture of a sharing buffer management system according to an embodiment of the present invention.

FIG. 1 schematically shows a structure of a sharing buffer management system according to an embodiment of the present invention. In this figure, reference numeral 100 represents the sharing buffer system according to an embodiment of the present invention, 200 the software portion of the sharing buffer system, and 300 the hardware portion of the sharing buffer system. In addition, the buffer management system 100 also includes an adaptive operating system, which is not shown.

In the software portion 200, each of the multiple threads 220-1, . . . , 220-n can include multiple transactions. As shown in this figure, thread 220-1 includes transactions 2201 and 2202, and thread 220-n includes transactions 2203, 2204 and 2205. Threads 220-1, . . . , 220-n can belong to the same process or different threads. In the system 100, threads 20-1, . . . , 220-n are executed in parallel, while the multiple transactions in the same thread are executed in a serial manner.

Software portion 200 includes a predictor module 210 for predicting the data size of each transaction, i.e., a sharing buffer demand size. Predictor module 210 can be deployed in the software at runtime, for example, be stored in a runtime library. Such placement can provide the system with many advantages, for example, simplifying the system hardware design, achieving good flexibility, and supporting more complex predication algorithms, for example.

Before a transaction requests the start of execution, it will get its possible write data size from predictor module 210. This data size can be offered at a certain granularity. The selection of a granularity measuring a transaction data size is related with the physical design of sharing buffer. The sharing buffer management system can be simplified through modifying the physical design of the sharing buffer. This will be elaborated below in conjunction with the description of the hardware portion. If the predicted data size for this transaction is always larger than the total hardware buffer, then this transaction will directly fall into special handling for overflow transactions. If the predicted data size for this transaction is within a reasonable range, then a resource management module 310 in the hardware portion 300 is notified for the allocation of buffer resources.

Hardware portion 300 includes a sharing buffer 320 and resource management module 310, where resource management module 310 manages the allocation and recycle of hardware resources, especially resources of the sharing buffer 320, at a certain granularity.

Specifically, resource management module 310 includes current resource recording means 3101 and resource management logic means 3102. Current resource recording means 3101 is for recording information on currently available buffer resources. According to the predicted transaction size notification from the software portion 200 and based on the information on currently available resources in sharing buffer 320 as recorded by current resource recording means 3101, resource management logic means 3102 executes the resource management for sharing buffer 320, including: allocating transaction sharing memory through allocating logic at the beginning of the transaction, addressing corresponding buffer resources when a transaction is aborted or committed, and in order to perform a corresponding operation, recycling available buffer resources of sharing buffer 320 through recycling logic and updating current resource recording means 3101.

A general description has been given to the technical implementation of the present invention with reference to FIG. 1. The concrete implementation of each component has many optional implementation modes. According to the basic architecture of a sharing buffer management system shown in FIG. 1, predictor module 210 in the runtime library of software portion 200 can be designed to carry out a predication algorithm and/or policy on the transaction size so as to be better adapted to various application conditions. And the means by which software portion 200 notifies resource management module 310 in hardware portion 300 of a predicted transaction data size before the beginning of the transaction can also be implemented in various ways. For example, it is implemented by the parameters of existing instructions or implemented through specially setting notification instructions, for example.

The sharing buffer management architecture according to the embodiment of the present invention can be applied to a variety of sharing buffers. In other words, through modifying the hardware design scheme for a sharing buffer, the performance of the sharing buffer management system according to the present invention can be further improved without increasing the hardware cost.

Actual embodiments of the sharing buffer management system according to the embodiments of the present invention and an operating procedure will be further described below with reference to FIGS. 2 through 4.

Figure 2:
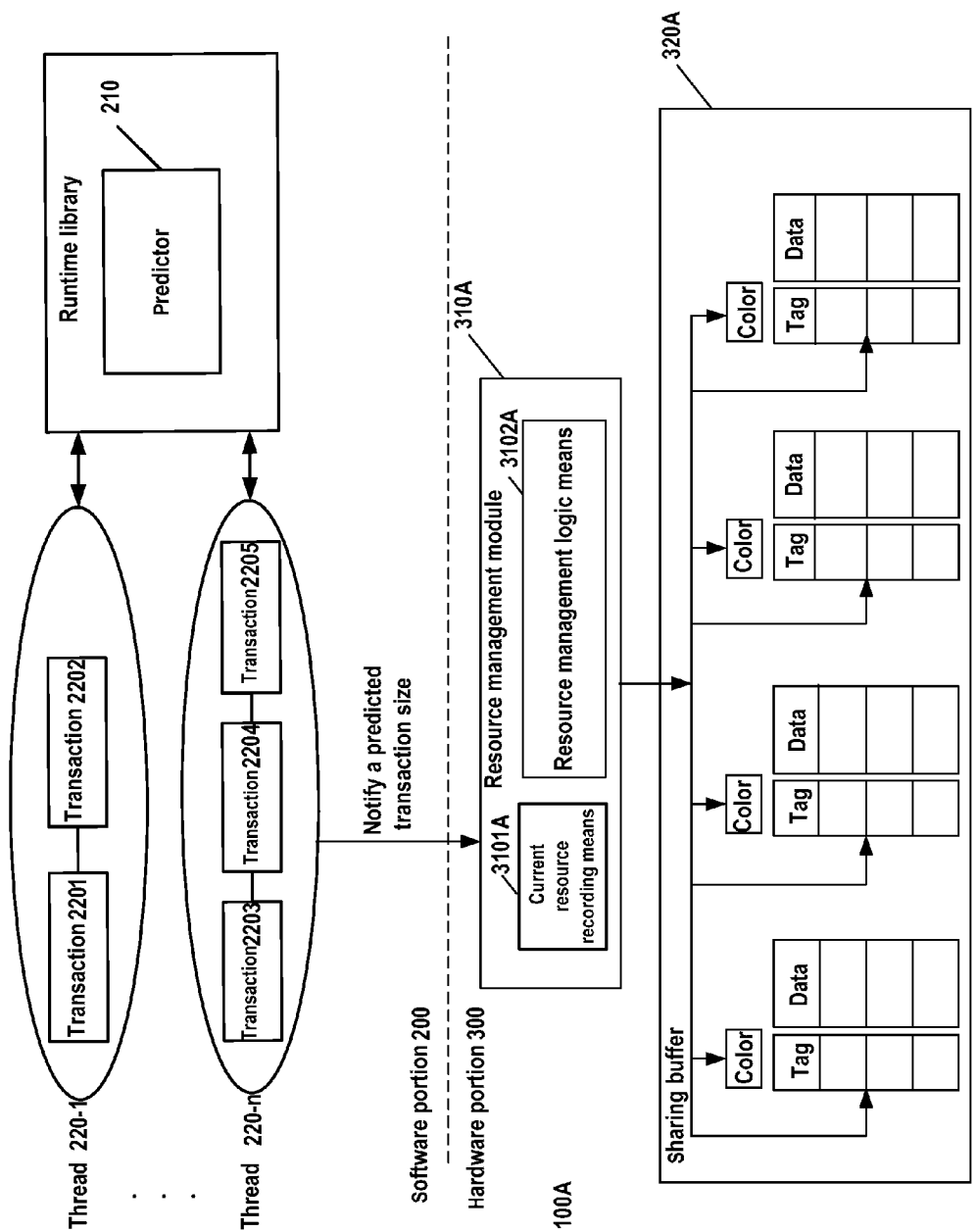
FIG. 2 schematically shows the structure of a sharing buffer management system according to an embodiment of the present invention.

FIG. 2 schematically shows the structure of a sharing buffer management system according to an embodiment of the present invention. A sharing buffer management system 100A as shown in FIG. 2 combines a prediction mechanism and a novel coarse-grain sharing buffer. As an example, a sharing buffer 320A shown in FIG. 2 is a 4-way associated cache. Resource management module 310A carries out the resource management of the sharing buffer at the granularity of the cache way, where each cache way is a group of cache lines. Specifically, the sharing buffer can dynamically allocate the sharing buffer for multiple transactions at the granularity of the cache way according to a predicted transaction data size. Therefore, in sharing buffer 320A a color flag and corresponding control logic are configured for each cache way. Such design can reduce the hardware cost and obtain a flexible software prediction mechanism.

The sharing buffer management system 100A will be described in terms of workflow. In a program, each of the transactions 220-1, ..., 220-n is marked by transaction_begin( ) a transaction begin runtime function, and transaction_end( ) a transaction end runtime functions. In transaction_begin( ) predictor module 210 at runtime manages the prediction of the on-demand data size of this transaction according to historical information before entering the transactional region, e.g., before the execution of trans_begin instruction.

If the predicted data size for this transaction is larger than the total hardware buffer size, then this transaction will directly fall into special handling for overflow transactions. If the predicted data size for this transaction is within a reasonable range, for example, the current hardware available buffer area size can satisfy the predicted data size, the predicted data size can be passed to resource management module 310A of hardware portion 300. In this embodiment, the predicted data size is indicated to resource management module 310A of hardware portion 300 as a parameter of trans-begin instruction.

Hardware resource management module 310A compares the predicted size with the currently available size of the sharing buffer, according to the information in current resource recording means 3101A. If there are enough resources, then this request is approved, i.e., the trans_begin instruction is executed normally. Otherwise, the trans_begin instruction returns zero, i.e., this transaction is not executed successfully. At this point, the control flow can direct this transaction to retry, for example, retry at once or wait for a time to retry, so that this transaction can be executed when there are enough available buffer resources in sharing buffer 320A.

During the transaction execution, transaction_begin( ) checks whether the returned value of trans_begin instruction is zero or not. If this transaction is not successfully executed during a trial, i.e., the allocated sharing buffer, called pseudo overflow here, overflows during the execution of this transaction. Then resource management module 310A reports the overflow and retries according to the policy in the workflow until this transaction is re-executed. The requested data size will be added by some certain value based on the value predicted by predictor module 210 at each of the transaction retries. This iterative method guarantees that each transaction can be eventually carried out in case of pseudo overflow. Once a transaction commits successfully, the last buffer size occupied by this transaction will be treated as this transaction's actual data size. This data size will be stored in the history information facilitating the performance of predictor module 210.

In software portion 200, predictor module 210 will predict a transaction data size for each transaction to be executed. In this embodiment, the predicted transaction data size is given at the granularity of the cache way, i.e., coarse grain. When each transaction retries as a result of overflow, pseudo overflow, of the allocated buffer size which is equal to the predicted transaction data size, software portion 200 will increase the buffer data size requested by the transaction at the granularity of the cache way, for example, incrementing a cache way once. Once a transaction commits successfully, predictor module 210 records the actual buffer size used by the transaction as the data size in its history information.

Since each transaction requires predictor module 210 to provide the predicted transaction data size, the implementation of predictor module 210 should not be overly time consuming. Although there are a variety of feasible algorithms for predicting transaction data sizes, it is to be understood that predictor module 210 should not adopt a too complex prediction algorithm. The data storage saving the history information for each transaction, e.g., a hash-table, should be lock-free in case that multiple transactions from different threads try to access and update history information concurrently.

In sharing buffer management system 100A shown in FIG. 2, predictor module 210 can have a two-level software hash table recording the latest N times of data size information for each transaction, e.g., transaction ID. The two-level hash table is designed with lock-free characteristics. The first level of the hash table is indexed by thread IDs, and the second level is indexed by transaction start addresses. The two-level structure of this hash table ensures that each thread has its private hash table, which avoids lock/unlock operations at the time of updating history information. The insert and delete operations for first-level entries can lock/unlock the hash table. Such actions are performed much less frequently than for updating the history information since they are only needed in case of thread creation and retirement.

As described above, the use of an over-complicated prediction algorithm by predictor module 210 might have negative effects on the system performance. Here, several prediction algorithms are discussed as examples of prediction algorithms.

(1) Latest Value Prediction

In this algorithm, the latest data size requested by a transaction will be predicted as the data size needed during the execution of this transaction. It is uncomplicated enough that predictor module 210 only needs a very short time to present a prediction result, and that the maintained hash table has only one node for each transaction entry. Therefore, storage space is saved. When each transaction commits successfully, the history information on the transaction data size for each transaction entry is updated according to the actual sharing buffer size occupied by the transaction.

(2) Average Value Prediction

In some applications, the same transaction region can have variable write data sizes at each execution. For example, a transaction can have a loop structure which executes different iterations at each instance. As far as these irregular cases, a complex algorithm such as a Markov model, for example, can be used for predicting data sizes. However, since avoiding excessive operation time is a major factor to be taken into consideration, only the average value prediction is used for a simple averaging operation on a specific number N of history data size values. The average value prediction algorithm can strike a good balance between time consumption and precision. In this algorithm, the latest N data size information is recorded for each transaction in a hash table. The average value of the latest N data size values will be treated as the predicted value when the transaction is to be executed.

(3) Other Prediction Algorithms

In practice, other prediction algorithms can be adopted according to different applications and transaction characteristics among threads of an application. For example, the maximum value can be selected from among N history data size values as the data size prediction for a transaction to begin soon; a change trend, increase or decrease, of data sizes can be simulated with certain amplitude each time transactions are executed, for example.

It is understood by those skilled in the art that the prediction algorithm used for predicting transaction data sizes by predictor module 210 can be configured flexibly so that any prediction algorithm or a combination of prediction algorithms can be used.

In hardware portion 300, resource management module 310A manages the allocation and recycle of hardware resources, especially resources for sharing buffer 320A, at the granularity of the cache way. Resource management module 310A is composed of current resource recording means 3101A and resource management logic means 3102A.

Current resource recording means 3101A, for example, can be implemented as a counter register to record the number of currently available cache ways. Current resource recording means 3101A is updated at the beginning, commitment, and abortion point of any transaction. Such an update action is accomplished by resource management logic means 3102A. Resource management logic means 3102A compares the requested transaction size for a certain transaction, carried in trans_begin instruction, with a value maintained by the counter register of current resource recording means 3101A. Only when the value in the counter register of current resource recording means 3101A is larger than or equal to the requested data size, the request will be responded to and the returned value of trans_begin instruction is set as 1. Otherwise, the request will be rejected and the returned value of trans_begin instruction is set as 0. At this point, the control flow can direct this transaction to retry, for example, retry at once or wait for a moment to retry, so that this transaction can be executed when the counter register of current resource recording means 3101A shows there are enough available buffer resources in sharing buffer 320A.

Resource management logic means 3102A can have relatively simple logic. It should be noted that resource management logic means 3102A can access and update the color register and its valid flag distributed in each cache way in sharing buffer 320A. The workflow of resource management logic means 3102A in different scenarios is described below.

In the case of transaction begin, resource management logic means 3102A accesses and compares each color register allocated for each cache way. If one color register is available as indicated by an additional flag per color register, it means that this cache way can be allocated to the requested transaction. Then, this color register is set to the color value of the requested transaction and the requested data size will decrease by 1. This process continues until the requested data size is equal to 0, which indicates that all the requested hardware resources have been allocated.

In the case of transaction commit, resource management logic means 3102A locates the space of sharing buffer 320A occupied by the target transaction by iteratively comparing the color register of each cache way with the color value contained in the trans_commit instruction. Resource management logic means 3102A controls all speculative data stored in each cache line of all cache ways with the target color value to be written into the memory system.

In the case of transaction abort, resource management logic means 3102A locates the space of sharing buffer 320A occupied by the target transaction by iteratively comparing the color register of each cache way with the color value contained in the trans_rollback instruction. Then, resource management logic means 3102A controls all speculative data stored in each cache line of all cache ways with the target color value to be discarded and invalidated.

In transactional memory systems, any memory access request in a transactional region carries color information, which has to be considered in both version management and conflict detection. FIG. 3 schematically shows micrologic architecture of a sharing buffer according to an embodiment of the present invention of FIG. 2. A clear understanding of coarse-grained sharing buffer 320A outlined above can be obtained with reference to FIG. 3.

Figure 3:
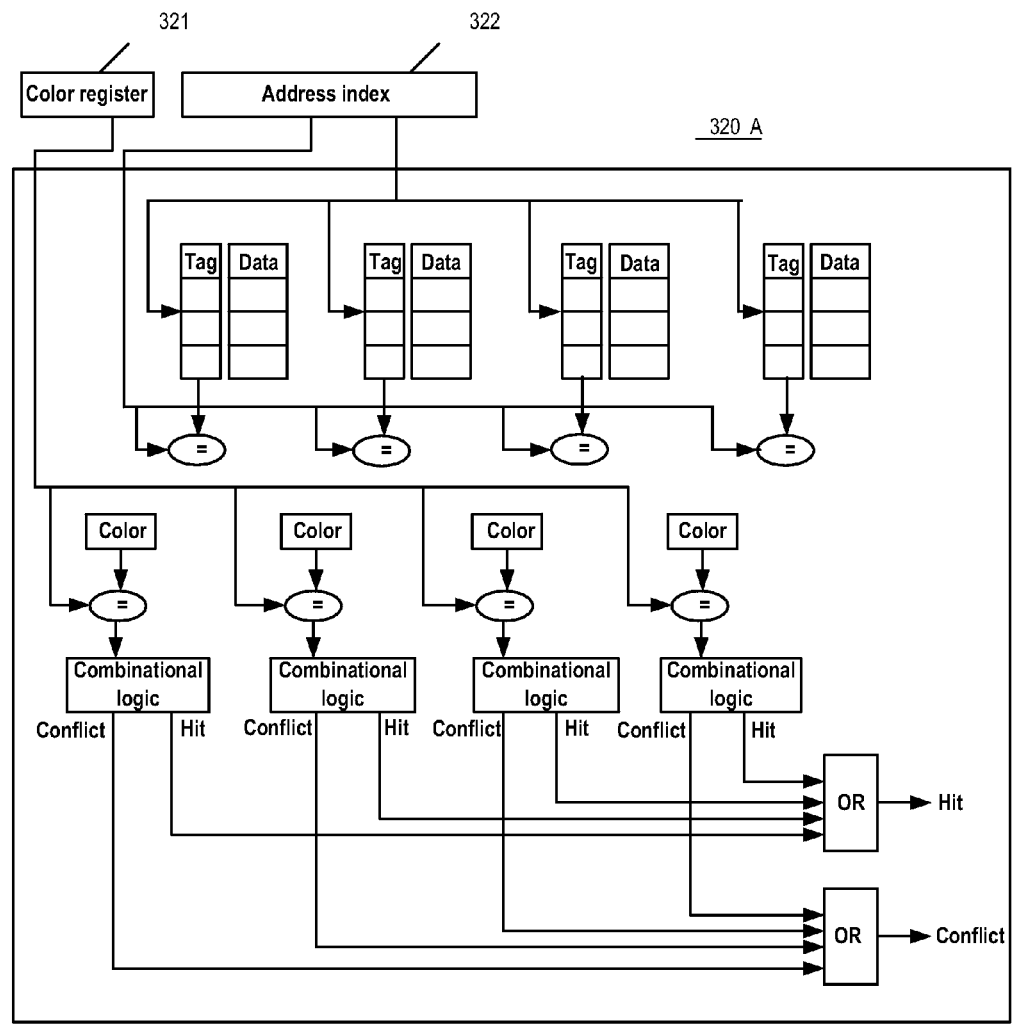
FIG. 3 schematically shows the micro-logic architecture of sharing memory according to the embodiment of FIG. 2 of the present invention.

Buffer 320A as shown in FIG. 3 is a 4-way associated cache. Each way includes 128 cache lines (only part of cache lines are shown in FIG. 3). A color register 321 is used to store a color value for a corresponding cache line.

Four cache lines at corresponding locations in each way can be addressed through an address index 322. A selector determines a hit or conflict occurrence according to tags and color values in a color register 321.

If the transaction load operation hits the cache line of some cache ways with the same color, it reads the speculative data in the cache line. If it misses, a normal cache miss signal is raised to a cache controller. If the transaction load operation hits the cache line of cache ways with different colors, a read-after-write (RAW) conflict is detected, and a hardware exception is reported. The exception will then fall into an exception processing program in the runtime library.

The transaction store operation also checks the cache. If it hits the cache line of cache ways with the same color flag, then speculative data in the cache line is updated. If it misses, an invalid message will be sent to all other remote sharing buffers to detect a potential conflict and it will own the exclusive write operation privilege. If it hits the cache line of cache ways with different color flags, a write-after-write (WAW) conflict is detected.

A remote cache coherence message is snooped by a local sharing buffer. If Its address hits the cache line of a local sharing buffer, a conflict is detected. If this message is caused by read operation miss, the conflict is an RAW conflict; if this message is caused by store miss, the conflict is WAW. In this case, the value of the color register is not considered since any kind of hit indicates a conflict occurrence regardless of whether or not color values are the same. This address also has to check the local transactional-read buffer or signature.

Once a conflict is detected, an arbiter determines which one of the transactions should be aborted. The color information can be passed to resource management module 310A by a trans_rollback instruction. Then, resource management module 310A aborts all cache ways with the same color information.

Even if the transaction data size can be precisely predicted at the beginning of a transaction, the transaction can still overflow the allocated cache as a result of conflict miss. This is a common occurrence. Since conflict miss is a rare case compared with capacity miss, brief illustrative solutions are set forth. A victim buffer is established to store the replaced data to release the cache miss penalty. The sharing buffer structure shown in FIG. 3 can also adopt a victim buffer to deal with conflict miss. There are different options for designing the victim buffer. A simple option allows a victim buffer to store data with the same color. It needs only one color register in this case. A more complicated option is to add a color register to each entry of a victim buffer. Because the victim buffer space is relatively small, the later design can be adopted.

Figure 4:
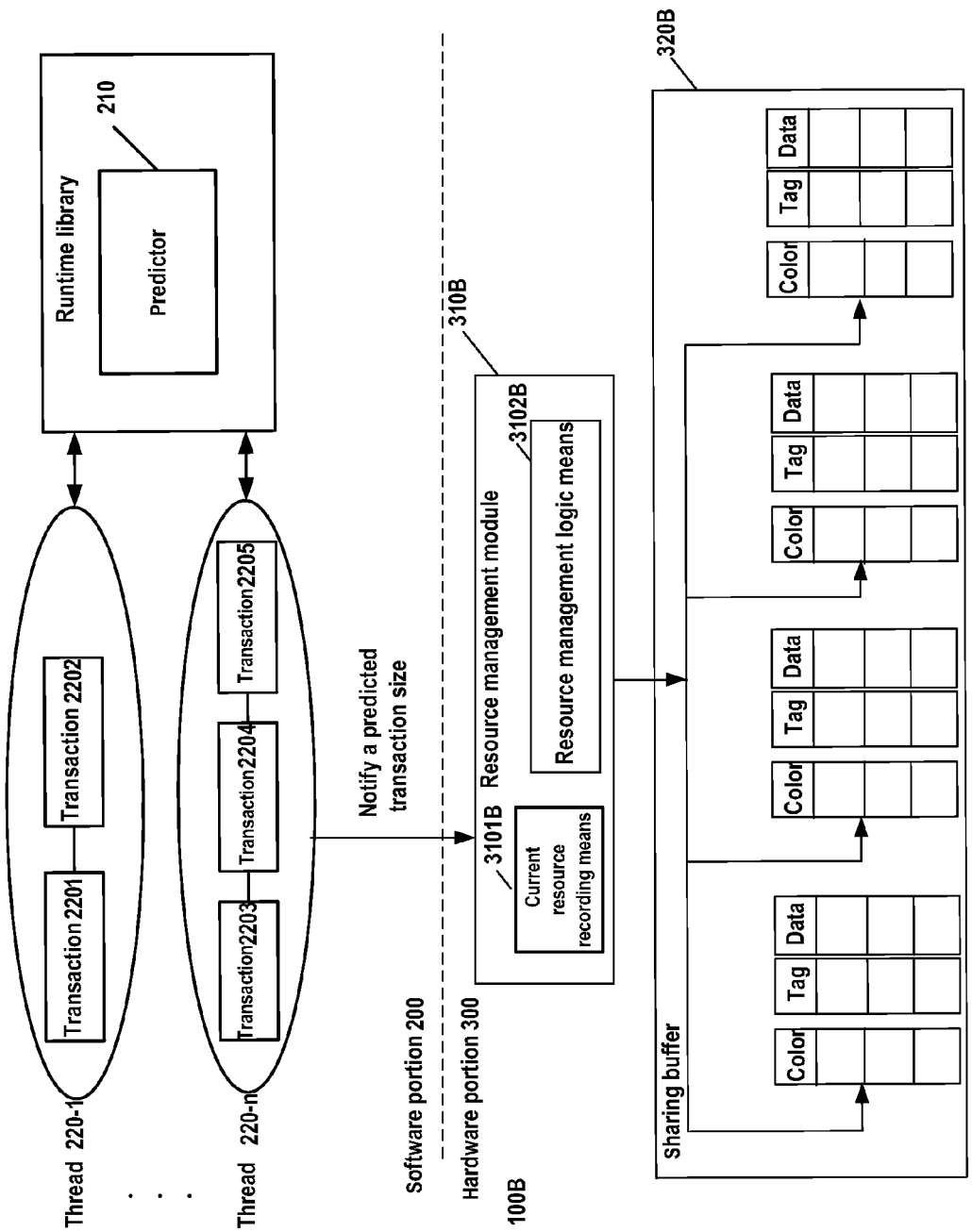
FIG. 4 schematically shows the structure of a sharing buffer management system according to another embodiment of the present invention.

FIG. 4 schematically shows the structure of a sharing buffer management system according to an embodiment of the present invention. A sharing buffer management system 100B, shown in FIG. 2, combines a prediction mechanism and a traditional fine-grained sharing buffer. As an example, a sharing buffer 320B shown in FIG. 4 is a 4-way associated cache. A resource management module 310B carries out resource management for the sharing buffer at the fine granularity of cache line. Specifically, the sharing buffer can dynamically allocate the sharing buffer for multiple transactions at the granularity of cache line according to predicated transaction data sizes, i.e., at the granularity of cache line. Therefore, as in the case for the design of a traditional sharing buffer, a color flag and corresponding logic are configured for each cache line in sharing buffer 320B.

It is understood by those skilled in the art that although the embodiment shown in FIG. 4 and that shown in FIG. 2 adopt different sharing buffer designs, they are similar to each other in terms of operating principles, and procedures for the sharing buffer management systems, especially the implementation of the systems' workflow and software portion 200. The exception is that predictor module 210 predicts a transaction data size for a transaction which will begin soon, at the fine granularity of cache line.

In hardware portion 300, resource management module 310B manages the allocation and recycle of hardware resources, in particular, resources of the sharing buffer 320B, at the granularity of the cache way. It is understood by those skilled in the art that since sharing buffer 320B adopts the traditional fine-grained, at the granularity of cache line, in the design in this embodiment, resource management module 310B, though having basically the same operating principles, has a different implementation from resource management module 310A shown in FIG. 2.

In resource management module 310B, current resource recording means 3101B is implemented as a recording table which records existing colors in a current buffer, the number of requested cache lines, the number of actually occupied cache lines. Current resource recording means 3101B can have information on the number of currently available cache resources by subtracting cache lines actually occupied by respective transactions, corresponding to different colors, from total cache lines in sharing buffer 320B.

When a certain transaction requests the beginning of execution, resource management logic means 3102B compares the requested transaction size for this transaction as carried in trans_begin instruction, with the number of currently available buffer resources as indicated in current resource recording means 3101B, to determine whether the execution of this transaction can begin. If the data size requested by the transaction exceeds the number of currently available buffer resources, the transaction begin request will be responded to and the returned value of trans_begin instruction is set as 1.

Otherwise, the request will be rejected and the returned value of trans_begin instruction is set as 0. At this point, the control flow can direct this transaction to retry, for example, retry at once or wait for a moment to retry, so that this transaction can be executed when current resource recording means 3101B shows that there are enough buffer resources in sharing buffer 320B. At each transaction retry, resulting from overflow called pseudo overflow, of the allocated buffer size which is equal to the predicted transaction data size, software portion 200 will increase the buffer data size requested by this transaction, for example, by a predetermined number of cache lines each time. Each time the transaction writes data into a new cache line during execution, resource management logic means 3102B updates the table maintained in current resource recording means 3101B.

Since sharing buffer 320B adopts a traditional fine-grained structure, management and control logic which is adopted by resource management logic means 3102B for sharing buffer 320B in various scenarios is similar to logic adopted in related art. Those skilled in the art can implement read, write, conflict detection and other operations with respect to sharing buffer 320B in various scenarios in an existing fashion. Thus, a detailed description is omitted.

Figure 5:
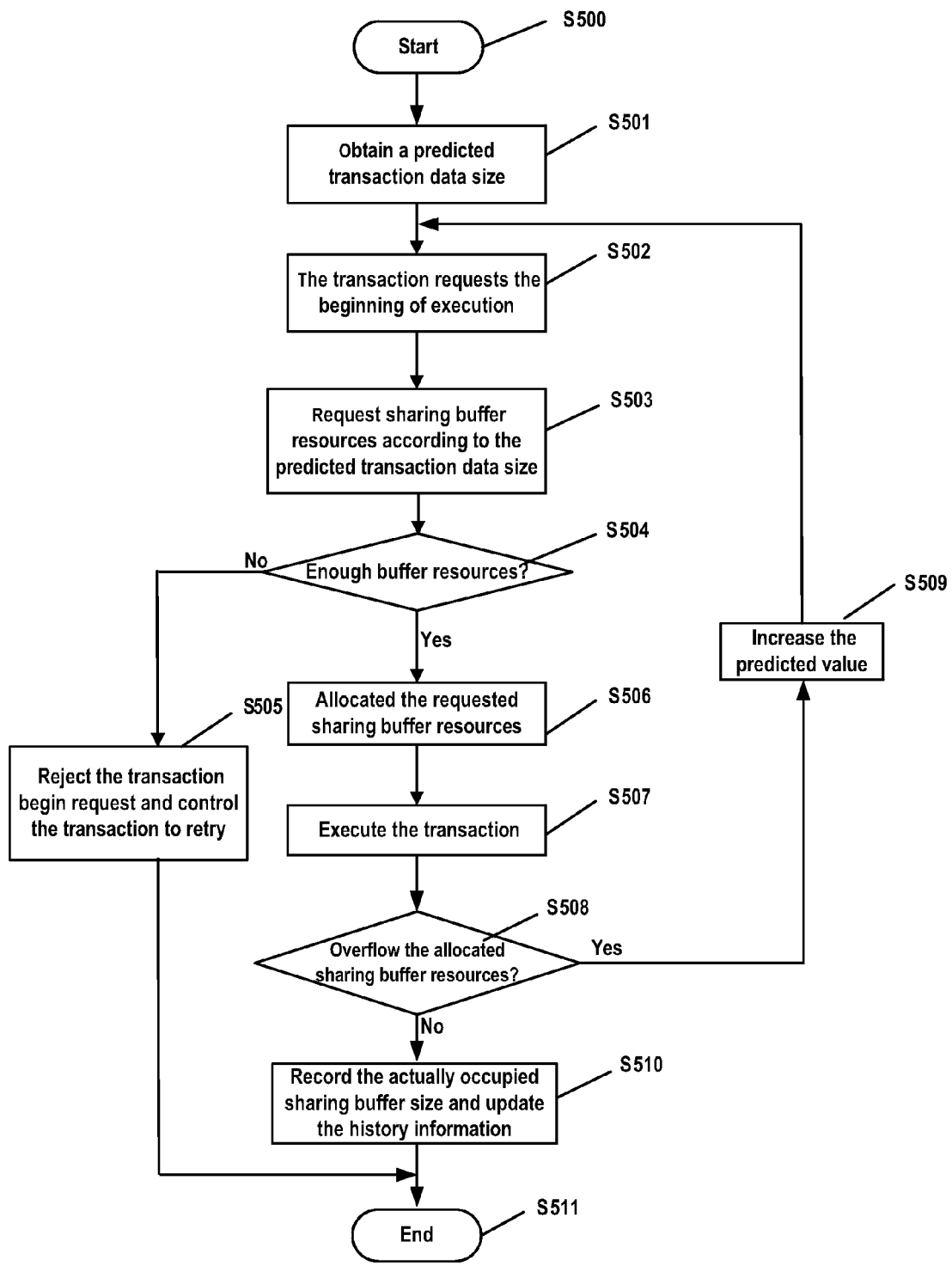
FIG. 5 shows a flowchart of a sharing buffer management method according to an embodiment of the present invention.

FIG. 5 shows a flowchart of a sharing buffer management method according to an embodiment of the present invention. The flowchart of this method starts at step S500.

In step S501, a predicted transaction data size is obtained. This data size can be given at a certain granularity. The selection of the granularity measuring a transaction data size is related to the physical design of the sharing buffer. The prediction of the transaction data size of a certain transaction can be carried out by a predictor, which is implemented during the runtime, based on history information of the transaction's data size. At this point, if the predicted transaction data size of the predictor is larger than the sharing buffer resources, then this transaction can directly fall into special handling, not shown, for transaction overflow.

In step S502, the transaction requests the beginning or starting of execution through runtime function transaction_begin( ).

In step S503, hardware resources of the sharing buffer are requested according to the predicted transaction data size. In an embodiment, the predicted data size can be indicated to a resource manager module in the hardware portion as a parameter of trans_begin instruction.

In step S504, the predicted size is compared with the currently available size of the sharing buffer to determine whether there are enough sharing buffer resources or not.

If yes, the flow continues to step S506; if not, then overflow occurs at this point and the flow continues to step S505.

In step S505, the request of the transaction begin is rejected and the transaction is directed to retry. The trans_begin instruction is re-executed at once or is re-executed in a short period of time. At this point, the requested transaction data size does not need to be changed.

In step S506, the requested sharing buffer resources are allocated to the transaction in the hardware portion, where the size of the allocated sharing buffer is equal to the predicted transaction data size.

In step S507, this transaction begins to be executed.

In step S508, determination is made as to whether the transaction has overflowed the allocated sharing buffer resources or not. For example, whether this transaction is executed normally can be determined by checking whether the returned value of trans_begin instruction is zero.

If the transaction is not successfully executed in one trial, i.e. the allocated sharing buffer overflows during the execution of the transaction, called pseudo buffer, then the flow continues to step S510. If this transaction is successfully executed, i.e. the allocated sharing buffer does not overflow during the execution of this transaction, then the flow continues to step S509.

In step S509, the predicted transaction data size is increased by a specific value, and the resulting value is treated as a new predicted value. The flow returns to step S502 to retry this transaction. This iterative method guarantees that each transaction can be eventually responded to in case of pseudo overflow.

Once this transaction commits successfully, in step S510, the actual buffer size occupied by this transaction is recorded as this transaction's data size, and the history information on this transaction is updated. The flow of this method then ends in step S511.

Note, in order to set forth the sharing buffer management method according to the present invention more clearly, the method shown in FIG. 5 and the foregoing description of FIG. 5 omit those hardware operating steps which have been described with reference to FIGS. 1 through 4, and omit implementation steps that are well known to those skilled in the art but which might be indispensable to the implementation of the present invention.

While the present invention has been described with reference to what are presently considered to be the preferred embodiments, it is to be understood that the present invention is not limited to the disclosed embodiments. On the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A sharing buffer management system, comprising:
   a predictor module to predict at runtime a transaction data size of a transaction according to history information of the transaction; and
   a resource management module to allocate sharing buffer resources for the transaction according to the predicted transaction data size in response to beginning of the transaction, to record an actual sharing buffer size occupied by the transaction in response to the successful commitment of the transaction and update the history information of the transaction.

2. The system according to claim 1, wherein:
   the predictor module increases said predicted transaction data size by a predetermined value in response to the transaction overflowing the allocated sharing buffer resources and uses the increased predicted transaction data size as a new predicted transaction data size; and
   the resource management module allocates sharing buffer resources for the transaction according to the new predicted transaction data size.

3. The system according to claim 1, wherein the resource management module is configured to:
   compare said predicted transaction data size with currently available resources of said sharing buffer;
   allocate sharing resources which are equal to the predicted transaction data size for the transaction in response to having enough sharing buffer resources; and
   allocate no sharing resources for the transaction and reject the beginning of the transaction in response to not having enough sharing buffer resources for the transaction.

4. The system according to claim 1, wherein the resource management module directs the transaction to special handling for transaction overflow in response to said predicted transaction data size being larger than said sharing buffer resources.

5. The system according to any one of claim 1, wherein the predictor module is configured to predict a transaction data size using at least one of latest value prediction, average value prediction, maximum value prediction, and amplitude simulation prediction.

6. The system according to claim 1, wherein the history information of said transaction comprises a two-level software hash table, wherein the first level is indexed by thread identification and the second level is indexed by transaction address.

7. The system according to claim 1, further comprising:
   a cache way in said sharing buffer consisting of a color register for storing a color flag for the transaction.

8. The system according to claim 7, wherein said predictor module is configured to predict a transaction data size for a transaction at the granularity of the cache way and said resource management module is configured to allocate sharing buffer resources at the granularity of the cache way.

9. The system according to claim 1, wherein the sharing buffer comprises:
   a plurality of associated cache ways, wherein each of the cache ways has a plurality of cache lines;
   an address index for addressing cache lines at locations in each cache way;
   a color register for storing a color value for each cache way, wherein each color value corresponds to a transaction, and
   wherein said sharing buffer is configured to share buffer resources among multiple transactions at the granularity of the cache way.

10. A method implemented by a computing apparatus for managing a sharing buffer, the method comprising the steps of:
    predicting at runtime by a predictor module a transaction data size of a
    transaction according to history information of the transaction;
    allocating sharing buffer resources for the transaction by a resource management module according to the predicted transaction data size in response to beginning of the transaction;
    recording by the resource management module an actual sharing buffer size occupied by the transaction in response to the successful commitment of the transaction; and
    updating the history information of the transaction by the resource management module, thereby managing the sharing buffer by the computing apparatus.

11. The method according to claim 10, further comprising:
    increasing by the predictor module, said predicted transaction data size by a predetermined value in response to the transaction overflowing the allocated sharing buffer resources;
    using the increased predicted transaction data size by the predictor module as a new predicted transaction data size;
    allocating, by the resource management module, sharing buffer resources for the transaction according to the new predicted transaction data size; and
    restarting the transaction.

12. The method according to claim 10, wherein the step of allocating sharing buffer resources by the resource management module further comprises:

comparing said predicted transaction data size with currently available resources of said sharing buffer;

allocating sharing resources which are equal to the predicted transaction data size for the transaction in response to having enough sharing buffer resources for the transaction;

in response to not having enough sharing buffer resources for the transaction, allocating no sharing resources for the transaction; and when no sharing resources are allocated, rejecting the beginning of the transaction.

13. The method according to claim 10, further comprising:

directing the transaction by the resource management module to special handling for transaction overflow in response to said predicted transaction data size being larger than said sharing buffer resources.

14. The method according to claim 10, wherein predicting the transaction data size by the predictor module uses at least one of a latest value prediction, an average value prediction, a maximum value prediction, and an amplitude simulation prediction.

15. The method according to claim 10, further comprising:

configuring the history information of said transaction as a two-level software hash table, wherein the first level is indexed by thread identification and the second level is indexed by transaction address.

16. The method according to claim 10, further comprising:

configuring a color register for a cache line in said sharing buffer; and storing a color flag for a transaction in said color register.

17. The method according to claim 16, wherein the step of predicting a transaction data size for a transaction is performed at granularity of the cache line, and the step of allocating sharing buffer resources is performed at granularity of the cache line.

18. A computer readable article of manufacture tangibly embodying computer readable instructions which, when executed, cause a computing apparatus to implement a method for managing a sharing buffer, comprising:

predicting at runtime by a predictor module a transaction data size of a transaction according to history information of the transaction;

allocating sharing buffer resources for the transaction by a resource management module according to the predicted transaction data size in response to beginning of the transaction;

recording by the resource management module an actual sharing buffer size occupied by the transaction, in response to the successful commitment of the transaction; and updating the history information of the transaction by the resource management module.

* * * * *